July 22, 1952   J. R. MOORE   2,604,608
TIME WAVE GENERATING SYSTEM
Filed Nov. 28, 1942
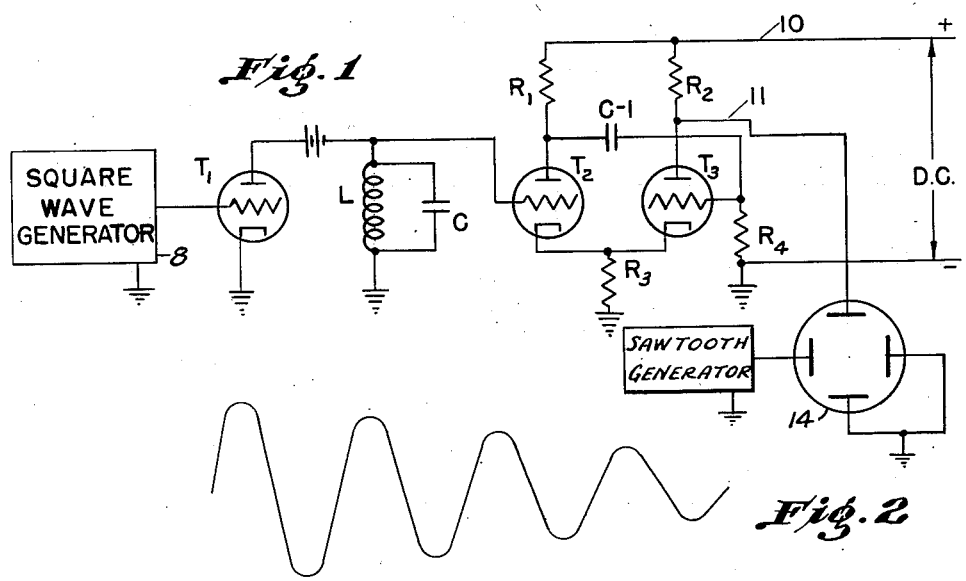
*Fig. 1*
*Fig. 2*
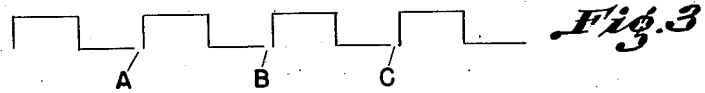
*Fig. 3*
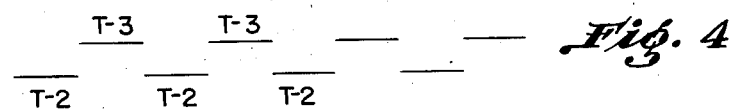
*Fig. 4*
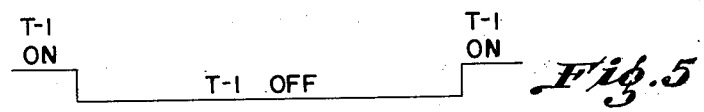
*Fig. 5*
INVENTOR
JAMES R. MOORE
BY William D. Hall
ATTORNEY Patented July 22, 1952

2,604,608

UNITED STATES PATENT OFFICE 2,604,608

TIME WAVE GENERATING SYSTEM

James R. Moore, Rumson, N. J., assignor to the United States of America as represented by the Secretary of War Application November 28, 1942, Serial No. 467,262

2 Claims. (Cl. 315—23)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to a method and means for generating a calibrating wave. While not limited thereto, it is particularly useful in initially calibrating the dial of a range determining mechanism used in radar systems such as is described and claimed in my copending application entitled "Method and Means for Determining Range," Serial Number 467,261, filed of even date herewith.

In said application I disclose a means to vary the magnitude of a voltage used to control the time of the appearance of a gap in a baseline displayed upon the screen of an oscilloscope. This gap is movable along the baseline and is made to assume a predetermined position with respect to an indication of a target, also displayed upon said screen, and preferably detected by a pulse-echo system for target detection. Inasmuch as the distance separating the target indication on said oscilloscope and the commencement of the baseline is made a measure of the range of the target and the voltage controlling the position of said gap is variable, it is necessary to calibrate the scale of the means controlling said voltage in terms of distance.

The wave generated in accordance with the method and means of the present invention is utilized to attain such calibration.

According to the invention, the output of a square wave generator, which is synchronized with the keyer of a pulse-echo object detection system, is used for keying an electron tube, the cathode-anode circuit of which includes an inductance-capacitance network which is shock-excited into oscillation every time the tube is made suddenly nonconductive by the negative portion of the rectangular wave from the square wave generator. The period of said oscillation is a small fraction of the pulse repetition rate of said object detection system. The output of said network is impressed on a fast acting shaping circuit which transforms the oscillations into substantially rectangular voltage waves of the same period. These voltage waves are impressed on the vertical deflection circuit of a cathode ray oscilloscope where they produce vertical, rectangular deflections of the base line. Since the period of said oscillations is known, it becomes possible to determine the duration of the rectangular waves, and thus calibrate in terms of range the dial of the range determining mechanism.

In the accompanying specification, I describe, and in the annexed drawings I show, an illustrative embodiment of the calibrating wave generating means of the present invention.

In the accompanying drawings,

Figure 1 is a schematic diagram of the electrical components of the present invention.

Figure 2 shows a series of damped oscillations used to control the generation of the calibrating wave of the present invention.

Figure 3 shows the calibrating wave produced under the control of the oscillations shown in Figure 2.

Figure 4 is a graphic representation of the operating time relationships of certain of the components of the present invention; and Figure 5 shows a master wave employed to control the production of the oscillations shown in Figure 2.

Referring now more in detail to the present invention, with particular reference to the drawings, the reference characters $T_1$, $T_2$, and $T_3$ designate three vacuum tubes, the plates of the latter two of which are connected respectively through resistors $R_1$ and $R_2$ and a common conductor $10$, with the positive side of a source of D. C. voltage, the negative side of which is grounded as shown. The plate of tube $T_1$ is connected to ground through a tank circuit comprising the inductance L and the capacitance C, the resonant frequency of the tank circuit being any multiple, not necessarily integral, of a square wave voltage which is applied to the grid of tube $T_1$. This square wave voltage is of the same frequency as, and is in synchronism with, the pulse frequency of a pulse-echo system of target detection of which the aforementioned range determining means comprises a part.

The cathode of tube $T_1$ is grounded; the cathodes of the tubes $T_2$ and $T_3$ are grounded through a common resistor $R_3$, the latter arrangement being such that when tube $T_3$ is conducting, tube $T_2$ is biased to cut-off by the voltage drop across resistor $R_3$.

The grid of tube $T_2$ is connected to the plate circuit of tube $T_1$, and the grid of tube $T_3$ is grounded through a resistor $R_4$, which biases tube $T_3$ so as to keep it normally conductive. This is due to the fact that the grid of tube $T_2$ is maintained slightly negative when tube $T_1$ is conducting by the direct voltage drop across inductance L due to the resistance thereof, while the grid of tube $T_3$ is maintained at ground potential. However, to further insure that tube $T_3$ is the one maintained normally conductive, the conventional expedient of making resistor $R_1$ slightly higher in value than resistor $R_2$ may be resorted to.

The plate circuit of tube $T_2$ is coupled to the grid of tube $T_3$ through a capacitance $C_1$, and the plate circuit of tube $T_3$ is connected through a conductor 11 to the vertical deflecting plates of an oscilloscope 14 comprising a component of the range determining device to be calibrated.

The operation and mode of use of the present invention may be briefly summarized as follows:

A square wave, such as is shown in Figure 5 of the drawing and preferably comprises a portion of the output of the pulse generating means of a pulse-echo system for target detection, is applied to the grid of tube $T_1$. This renders tube $T_1$ alternately conducting and non-conducting. For the purposes of this description it will be assumed that at the start of the cycle of operations to be described, the grid of tube $T_1$ is positive because of the positive signal impressed by wave 5 and therefore the tube is conducting. At this time tube $T_2$, because of the bias applied to its cathode through resistor $R_3$, is non-conducting; and tube $T_3$, because of the value of condenser $C_1$ and resistor $R_4$, is conducting. This relationship is illustrated in Fig. 4. A certain low D. C. voltage is therefore applied to the vertical plates of the oscilloscope.

While the tube $T_1$ is conducting, current flows to ground through inductance L. When the negative portion of the square wave applied to the grid of $T_1$ drives the same negatively, $T_1$ ceases to conduct and the magnetic field surrounding the inductance L collapses. This causes the tank circuit LC to produce damped oscillations, such as are illustrated in Figure 2, and these oscillations, applied to the grid of $T_2$, cause the latter to become alternately conducting and non-conducting. When $T_2$ is conducting, the flow of current through resistor $R_3$ increases, as does the voltage drop across this resistor and the cathode of $T_3$ becomes less negative with respect to its plate, thereby urging this tube toward cut-off. At the same time the current now flowing through resistor $R_1$ causes a voltage drop across said resistor, which decreases the potential on the plate of $T_2$. This decrease is communicated through capacitance $C_1$ to the grid of $T_3$, whereby the latter becomes biased to cut-off. The advantage of the described circuit resides in the fact that the square wave generator 8 and the shaping amplifier including triodes $T_2$ and $T_3$ are both fast-acting circuits which permits generation of the accurately spaced rectangular waves having substantially rectangular wave forms; also, there is an accurate synchronization of the transmitted pulse with the calibration waves.

The effect of this is to increase the potential on the plate of tube $T_3$, and this increase is conveyed, in the form of a sudden surge of voltage, through conductor 11 to the vertical plates of oscilloscope 14 where it produces a vertical deflection of the baseline. When the grid of the tube $T_1$ is again driven positive the original circuit conditions are restored, and continued repetition of the described complete cycle causes the appearance on oscilloscope 14 screen of the square wave, illustrated in Figure 3.

This square wave is synchronized with the damped oscillations produced by the tank circuit LC. Therefore, with the resonant frequency of the tank circuit known because of the known parameters, or because of its actual measurement with a frequency measuring apparatus, the time, and hence the distance between corresponding points on the trace of each cycle of the square wave appearing upon the oscilloscope screen becomes also known from the known velocity of propagation of the radio waves.

As above stated, the range determining means of my copending application utilizes a gap movable along the baseline displayed on the oscilloscope screen to calculate the range of the object causing the echo, and the movement of the gap is controlled by the bias potential applied to one of the tubes of the circuit. Hence, if the gap in the baseline is successively moved to corresponding points on each cycle of the square wave produced by the means of the present invention, as indicated at A, B, and C in Fig. 3, the scale associated with the means for controlling said bias potential can be calibrated in terms of distance.

The number of cycles of the square wave appearing on oscilloscope 14 screen will depend upon the multiple relationship between the frequency of the square wave applied to the grid of tube $T_1$ and the resonant frequency of the tank circuit LC. Therefore the latter should be selected so as to provide a sufficient number of calibrating points to enable the calibration of the scale in convenient units.

It will be noted from the foregoing that I have presented the method of calibrating range dials in terms of distance in radar systems by means of a simple synchronized and accurate wave generating circuit connected to the vertical deflection plates of the range oscilloscope.

Other objects and advantages of the present invention will be obvious to those skilled in the art to which the present invention relates.

I claim:

1. An electrical circuit for generating a calibrating wave on the face of a cathode ray oscilloscope having a given beam sweep frequency, said circuit including a square wave generator having a frequency equal to said beam sweep frequency, an inductance-shunted-by-capacitance network connected to and shock-excited by said generator, said network generating a plurality of damped oscillations for each half-period of said square-wave, a wave-shaping amplifier connected to said network, said amplifier including first and second vacuum tubes each having a cathode, an anode, and at least one control electrode, the control electrode of the first tube being connected to said network, and the control electrode of the second tube being connected to the anode of the first tube, a common cathode resistor connected to the cathodes of said tubes, an output circuit connected to the plate of said second tube, said amplifier converting the positive portions of said oscillations into substantially rectangular voltage waves, and means for applying said rectangular voltage waves to a beam control electrode of said cathode ray oscilloscope.

2. An electrical circuit for generating a calibrating wave on the face of a cathode ray oscilloscope having a given beam sweep frequency, said circuit including a source of square wave voltage having a frequency equal to said beam sweep frequency, an amplifier connected to said source of square wave voltage and having a cathode, an anode, and at least one control electrode, said control electrode being connected to said source of square wave voltage, an inductance-shunted-by-capacitance network in series with the cathode-anode circuit of said amplifier, said network being shock-excited to generate a plurality of oscillations during each negative portion of said square wave voltage when said generator makes said amplifier non-conductive, and a fast-acting wave-shaping amplifier connected to said network, said amplifier having first and second vacuum tubes each having a cathode, an anode, and at least one control electrode, the control electrode of the first tube being connected to said network, and the control electrode of the second tube being coupled to the plate of the first tube, a common cathode resistance connected to the cathodes of said tubes, an output circuit connected to the plate of said second tube, said wave-shaping amplifier converting said oscillations into a corresponding plurality of substantially rectangular waves, and means for applying said rectangular waves to deflection electrodes of said cathode ray oscilloscope for producing a deflection of said beam at right angles to said sweep in accordance with said rectangular waves.

JAMES R. MOORE.

REFERENCES CITED

The following references are of record in the file of this patent:

UNITED STATES PATENTS

| Number | Name | Date |
|---|---|---|
| 2,103,090 | Plebanski | Dec. 21, 1937 |
| 2,181,309 | Andrieu | Nov. 28, 1939 |
| 2,266,526 | White | Dec. 16, 1941 |
| 2,266,668 | Tubbs | Dec. 16, 1941 |
| 2,402,385 | Eaton | June 18, 1946 |
| 2,416,304 | Grieg | Feb. 25, 1947 |
| 2,416,328 | Labin | Feb. 25, 1947 |

OTHER REFERENCES

Sherman, "The Generation for Television of Horizontal Synchronizing Pulses from Vertical Pulses by Means of Impulse Excitation," Proceedings of the I. R. E., September 1940, pp. 406 to 409.